United States Patent [19]

Kobayashi

[11] Patent Number: 4,545,206
[45] Date of Patent: Oct. 8, 1985

[54] APPARATUS FOR CLEARANCE ADJUSTMENT IN BRAKE BOOSTER

[75] Inventor: Michio Kobayashi, Higashimatsuyama, Japan

[73] Assignee: Jidosha Kiki Co., Ltd., Tokyo, Japan

[21] Appl. No.: 624,636

[22] Filed: Jun. 26, 1984

[30] Foreign Application Priority Data

Jul. 11, 1983 [JP] Japan ................. 58-125826

[51] Int. Cl.$^4$ ............................................. B60T 13/60
[52] U.S. Cl. ........................................ 60/554; 60/593;
91/369 A; 91/376 R
[58] Field of Search ................. 60/554, 552, 553, 593;
91/369 R, 369 A, 369 B, 369 C, 389, 376 R

[56] References Cited

U.S. PATENT DOCUMENTS

| | | | |
|---|---|---|---|
| 3,082,744 | 3/1963 | Gardner | 91/369 A |
| 4,271,670 | 6/1981 | Ohmi | 60/554 |
| 4,282,799 | 8/1981 | Takeuchi | 91/369 A |
| 4,400,943 | 8/1983 | Belart | 91/369 A |
| 4,493,243 | 1/1985 | Horibe | 91/376 R |
| 4,505,114 | 3/1985 | Haar | 91/369 A |

Primary Examiner—Robert E. Garrett
Assistant Examiner—Richard S. Meyer
Attorney, Agent, or Firm—Flynn, Thiel, Boutell & Tanis

[57] ABSTRACT

For use in a brake booster of the type having a master cylinder disposed rearwardly of a booster mechanism having a power piston and in which a braking reaction force produced on an output shaft is transmitted therefrom to an input shaft through a reaction disc and a reaction transmitting member, an apparatus is provided for adjusting the magnitude of a clearance defined between the reaction disc and the reaction transmitting member. In this apparatus, the input shaft comprises a first section associated with the reaction transmitting member and a second section on which a valve seat is formed. The valve seat forms a valve mechanism disposed within a valve body for controlling the opening or closing of a passage for hydraulic fluid. The first and the second section of the input shaft are formed by separate members, both of which project toward the front shell and are connected together in a manner to permit their relative position to be adjusted. The relative position of the both members can be adjusted through an opening formed in the front shell, thus facilitating the adjustment of the clearance.

4 Claims, 1 Drawing Figure

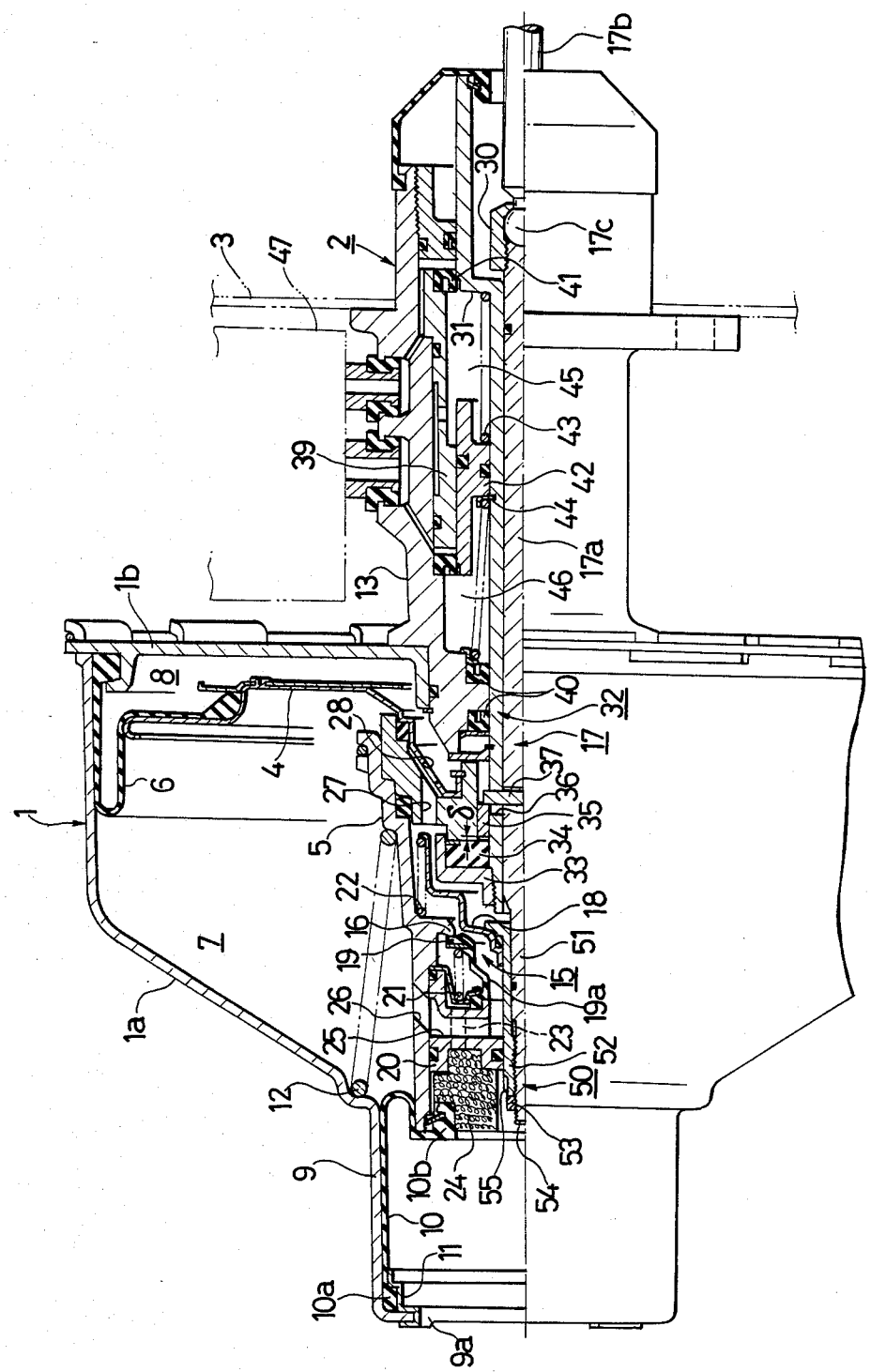

APPARATUS FOR CLEARANCE ADJUSTMENT IN BRAKE BOOSTER

FIELD OF THE INVENTION

The invention relates to a brake booster, and more particularly, to a brake booster of the type including a master cylinder disposed rearwardly of a booster mechanism having a power piston.

DESCRIPTION OF THE PRIOR ART

In a usual brake booster, namely, in a brake booster having a master cylinder connected forwardly of a booster mechanism, it is a common practice to transmit a brake reaction produced on an output shaft to an input shaft through a reaction disc and a valve plunger which forms a valve mechanism during the operation of the broke booster. In order to establish the timing when the transmission of a reaction force is to be initiated during the initial phase of operation of the brake booster, it is necessary to define a given clearance between the reaction disk and the valve plunger in the reaction transmission mechanism of the type including the reaction disk. Where such clearance must be provided within a given range with a high precision, it has been the practice in the prior art to provide an apparatus for clearance adjustment which can be adjusted to achieve a desired clearance with a high precision.

However, it should be understood that the conventional apparatus for clearance adjustment is adapted to be incorporated into a usual brake booster as mentioned above, and while such apparatus may be directly incorporated into a brake booster of the type contemplated in the present invention, namely, of the type including a master cylinder disposed rearwardly of a booster mechanism, such arrangement does not always represent an optimum arrangement.

SUMMARY OF THE INVENTION

It is an object of the invention to enable a clearance adjustment in a facilitated and accurate manner through a front shell side, based upon the finding that a free space is available outside the front shell in a brake booster of the type having a master cylinder disposed rearwardly of a booster mechanism, with the free space being provided when the master cylinder is connected.

Specifically, on accordance with the invention, an input shaft includes a first and a second section which are formed by separate members. The first section of the input shaft is mechanically coupled with a reaction transmitting member which is disposed in opposing relationship with a reaction disc with a given clearance therebetween for transmitting a reaction force to the input shaft upon abutment thereof against the reaction disc. The second section of the input shaft is formed with a valve seat disposed within a valve body to define a valve mechanism which controls to open or close a passage for hydraulic fluid. The both members which form the first and the second section project into a front shell and are interconnected in a manner so that their relative position can be adjusted. The front shell is formed with an opening through which the relative position of the both members can be adjusted. In this manner, a clearance adjustment can be performed in a facilitated and accurate manner through the front shell even when the master cylinder is connected.

Above and other objects, features and advantages of the invention will become apparent from the following description with reference to the attached drawing.

BRIEF DESCRIPTION OF DRAWING

The single drawing is a longitudinal section of one-half of one embodiment of the invention which is located above the centerline thereof.

DETAILED DESCRIPTION OF EMBODIMENT

Referring to the drawing, there is shown a shell including a front shell 1a and a rear shell 1b. The rear shell 1b has a shank portion, to which the free end of a master cylinder 2 is connected. The other end of the master cylinder 2 is secured to a carrosserie 3. A valve body 5 having a power piston 4 integrally formed therewith is disposed within the shell 1 so as to be reciprocable in the axial direction thereof. The interior of the shell 1 is divided into a constant pressure chamber 7 located toward the front shell 1a and a variable pressure chamber 8 located toward the rear shell 1b, by the combination of the valve body 5, the power piston 4 and a diaphragm 6.

The valve body 5 is generally cylindrical in configuration and is slidable while maintaining a hermetic seal of the shell by means of a seal member 10 which cooperates with the free end of the valve body and with a cylindrical portion 9 defined by a shank portion of the front shell 1a. The seal member 10 includes a front end 10a which is connected to the edge of an opening 9a, formed in the front end of the cylindrical portion 9, by means of a retainer 11. Intermediate its length, the seal member is folded back inwardly, with its other end 10b being connected to the free end of the valve body 5 so as to maintain the constant pressure chamber 7 hermetically sealed. A return spring 12 is interposed between the front shell 1a and the valve body 5 for normally urging the valve body into its non-operative position shown where it bears against the housing 13 of the master cylinder 2.

A valve mechanism 15 which switches a fluid circuit is disposed within the valve body 5, and comprises an annular first valve seat 16 formed around the inner periphery of the valve body 5, a second valve seat 18 disposed inside the first valve seat 16 and connected to the free end of an input shaft 17, and a valve element 19 which is adapted to be seated upon each of the valve seats 16, 18 from the front side of the power piston 4 or from the left side, as viewed in the drawing. In the non-operative position shown, a spring 21 interposed between the valve element 19 and a closure member 20, which closes the axial opening within the valve body 5, causes the valve element to be seated upon the first valve seat 16. Another spring 22 causes the second valve seat 18 formed on the input shaft 17 to be disengaged from the valve element 19 when the latter is seated upon the first valve seat 16.

In the embodiment shown, the member in which the second valve seat 18 is defined is substantially dish-shaped in order to cover a reaction disc 34, to be described in detail later, and the spring 22 is interposed between the valve body 5 and the member defining the second valve seat adjacent to the outer periphery of the reaction disc 34. Disposing the spring 22 around the outer periphery of the reaction disc 34 dispenses with the provision of a devoted space between the valve body 5 and the second valve seat 18 for accommodating such spring, thus allowing the axial length of the valve mechanism 15 to be reduced. Alternatively, this avoids the need to secure the closure member 20 firmly upon the valve body 5 which may be required as when the spring 22 is interposed between the closure member 20 and the second valve sheet 18.

Around its inner periphery, the valve element 19 includes a cylindrical seal 19a which is connected to the closure member 20, whereby the combination of the outer periphery of the cylindrical seal 19a, the closure member 20 and the seal formed between the valve element 19 and the first valve seat 16 defines a space which communicates with the atmosphere through a plurality of axial passages 23 formed in the closure member 20 and through a filter 24 disposed between the closure member 20 and the other end 10b of the seal member 10. On the other hand, the combination of the inner periphery of the cylindrical seal 19a, the closure member 20, the input shaft 17 and the seal formed between the second valve seat 18 on the input shaft and the valve element 19 defines another space which communicates with the constant pressure chamber 7 through a plurality of radial passages 25 formed in the closure member 20 in a manner to avoid their communication with the axial passages 23 also formed therein, and through a passage 26 formed in the valve body 5. Finally, a space located intermediate the seal formed between the valve element 19 and the first valve seat 16 and the seal formed between the valve element 19 and the second valve seat 18 communicates with the variable pressure chamber 8 through an axial passage 27 formed in the valve body 5 and through a passage 28 formed in the power piston 4.

The input shaft 17 comprises a first section 17a and a second section 17b, with the second valve seat 18 being formed on the first section 17a of the input shaft. The first section 17a of the input shaft slidably extends through a shank portion of the housing 13 of the master cylinder 2 and carries on its end opposite from the second valve seat 18, an interconnecting member 30 which is adapted to mount pivotally a sphere portion formed on the free end of the second section 17b of the input shaft. The other end of the second section 17b is mechanically coupled to a brake pedal, not shown. An output shaft 32 is slidably fitted around the first section 17a of the input shaft in surrounding relationship therewith for transmitting a thrust from the power piston 4 to a piston 31 received within the master cylinder 2. In the embodiment shown, the combination of the output shaft 32 and the piston 31 is formed by an integral stepped hollow shaft.

The free end of the output shaft 32 extends close to the second valve seat 18 on the input shaft 17, and threadably carries a cylindrical member 33 within which the reaction disc 34 is received. In this manner, the thrust from the power piston 4 and the valve body 5 can be transmitted through the reaction disc 34 and the cylindrical member 33. A resulting reaction force is transmitted from the reaction disc 34 to the brake pedal through a reaction transmitting member 35 which is slidably disposed around the output shaft 32, a pin 37 secured to the input shaft 17 and freely extending through an axial slot 36 formed in the output shaft 32 and responsive to the reaction transmitting member 35, and through the input shaft 17.

The output shaft 32 slidably extends through the shank portion of the housing 13 while maintaining liquid tightness by means of seal members 40, 41 mounted on the housing 13 and a sleeve 39, respectively. In the embodiment shown, the master cylinder is illustrated as a two circuit type including the piston 31 integral with the output shaft 32 and serving as a primary piston and also including a secondary piston 42 which is slidably fitted between the output shaft 32 and the sleeve 13 while maintaining liquid tightness. A spring 43 interposed between the both pistons 31, 42 normally maintains the piston 42 in abutment against a stop ring 44 formed on the output shaft 32.

Except for the specialized construction of the pistons 31, 42, the master cylinder 2 of two circuit type is similar to a corresponding master cylinder of two circuit type which is well known on the art, and therefore will not be described in detail. In the drawing, numeral 45 represents the pressure chamber of one circuit, 46 the pressure chamber of the other circuit and 47 a reservoir.

It will be noted that a given clearance $\delta$ is defined between the reaction disc 34 and the reaction transmitting member 35, and an apparatus 50 for adjusting the clearance $\delta$ is mounted on the free end of the input shaft 17. Specifically, the apparatus 50 comprises a shaft-like member 51 forming part of the input shaft section 17a and responsive to the reaction transmitting member 35, and a hollow shaft-like member 52 forming a portion of the input shaft section 17a on which the second valve seat 18 forming the valve mechanism 15 is defined. The shaft-like member 51 extends through and threadably engages the hollow shaft-like member 52 so as to achieve an interconnection which permits their relative position to be adjusted in the axial direction. Normally, the both members are connected together integrally by a nut 53. The both members 51, 52 slidably extend through the closure member 20 into the front shell 1a while maintaining hermetic seal, thereby permitting the relative position of the both members 51, 52 to be adjusted through the opening 9a formed in the front shell. It will be noted that a pair of slits 54, 55 are formed in the free end of the respective members 51, 52 to permit a tool, not shown, to be engaged therewith.

With the described arrangement in its non-operative position shown, the valve element 19 is seated upon the first valve seat 16 to interrupt the communication between the variable pressure chamber 8 and the atmosphere while the valve element 19 is removed from the second valve seat 18 to permit a communication between the constant pressure and the variable pressure chamber 7, 8. Accordingly, a negative pressure which is introduced into the constant pressure chamber 7 through a corresponding inlet, not shown, which is formed in the front shell 1a, is also introduced into the variable pressure chamber 8 through the passages 26, 25 through the clearance between the valve element 19 and the second valve seat 18 and through the passages 27, 28, producing no pressure differential across the power piston 4.

When a brake pedal, not shown, is then depressed to move the input shaft 17 to the left, the valve element 19 is seated upon the second valve seat 18 to interrupt the communication between the constant pressure chamber 7 and the variable pressure chamber 8, and a continued movement of the input shaft 17 to the left causes the valve element 19 to be disengaged from the first valve seat 16. Thereupon, the atmosphere is introduced into the variable pressure chamber 8 through the filter 24 and the passage 27, producing a pressure differential across the power piston 4 and the valve body 5, thus causing them to move to the left against the resilience of the return spring 12.

As the valve body 5 moves to the left, the thrust therefrom is transmitted to the primary piston 31 within the master cylinder 2 through the reaction disc 34, the cylindrical member 33 and the output shaft 32, supplying a braking liquid pressure to wheel cylinders of respective circuits, not shown, in the similar manner as with a master cylinder of two circuit type known in the art. In the meantime, a reaction force from the brake is transmitted to the brake pedal from the reaction disc 34 through the reaction transmitting member 35, the pin 37 and the input shaft 17.

When the brake pedal is then released, the valve mechanism 15 switches to the condition shown, thus returning the arrangement to its non-operative position.

The adjustment of the clearance δ between the reaction disc 34 and the reaction transmitting member 35 can be accomplished by inserting a tool through the opening 9a, formed in the front shell 1a, to loosen the nut 53, and then engaging a suitable tool with the respective slits 54, 55 to rotate the both members 51, 52 relative to each other, thereby causing a relative axial displacement of the members. It will be noted that the adjustment of the clearance δ is facilitated in this manner. In addition, it should be noted that such adjustment can be implemented while the master cylinder 2 is integrally connected to the shell 1 to allow the actual braking liquid pressure prevailing within the master cylinder 2 to be determined, thus allowing an accurate clearance adjustment. When a proper clearance δ is established, the nut 53 may be tightened to complete the adjustment.

It should be understood that the reaction transmitting member 35 may be formed integrally with the input shaft 17. Also, it is unnecessary that both members 51, 52, which form the apparatus for clearance adjustment, project through the closure member 20 into the front shell 1a.

While the invention has been shown and illustrated above in terms of an embodiment thereof, it should be understood that a number of changes, modifications and substitutions will readily occur to one skilled in the art without departing from the scope and spirit of the invention and that the invention is therefore solely defined by the appended claims.

What is claimed is:

1. For use in a brake booster including a shell having a front and a rear shell, a power piston slidably disposed within the shell, a valve mechanism disposed within a valve body formed as a shank portion of the power piston for controlling the opening or closing of a passage for fluid, a constant pressure chamber defined forwardly of the power piston and a variable pressure chamber defined rearwardly of the power piston, a master cylinder connected to the rear shell adjacent to the variable pressure chamber, an input shaft slidably extending through the master cylinder and mechanically coupled to the valve mechanism, a supply passage for supplying fluid to the valve mechanism from the front side of the power piston, a reaction disc disposed rearwardly of the valve mechanism for receiving a thrust from the power piston, an output shaft slidably fitted around the input shaft and mechanically coupled to a piston disposed within the master cylinder for transmitting a thrust from the power piston as received through the reaction disc to the piston within the master cylinder to produce a braking liquid pressure therein, and a reaction transmitting member disposed in opposing relationship with the reaction disc with a given clearance therebetween for transmitting a reaction force to the input shaft upon abutment thereof against the reaction disc; an apparatus for adjusting the clearance characterized in that the input shaft comprises a first section which is mechanically coupled with the reaction transmitting member and a second section on which a valve seat forming the valve mechanism is defined, the first and the second section being formed by separate members which are connected together in a manner to permit their relative postion to be adjusted, the both members projecting toward the front shell to permit their relative position to be adjusted through an opening formed in the front shell.

2. An apparatus according to claim 1, further characterized in that the first section of the input shaft has its free end portion being formed to be shaft-like while said second section of the input shaft on which the valve seat forming the valve mechanism is defined is formed as a hollow shaft, with the both members being threadably engaged with each other to permit their axial positions to be adjusted.

3. An apparatus according to claim 1, further characterized in that a cylindrical seal member is disposed between the valve body and the opening formed in the front shell to permit a reciprocating movement, and wherein the interior of the cylindrical seal member defines the supply passage, the supply passage also serving to enable the relative position of the both members to be adjusted.

4. An apparatus according to claim 1, further characterized in that the reaction transmitting member is slidably fitted around the output shaft and has a front end face which is disposed in opposing relationship with the reaction disc, the reaction transmitting member also having a rear end face which is disposed for abutment against a pin which extends through an axial slit formed in the output shaft and mechanically coupled with the input shaft.

* * * * *